Figure 1:
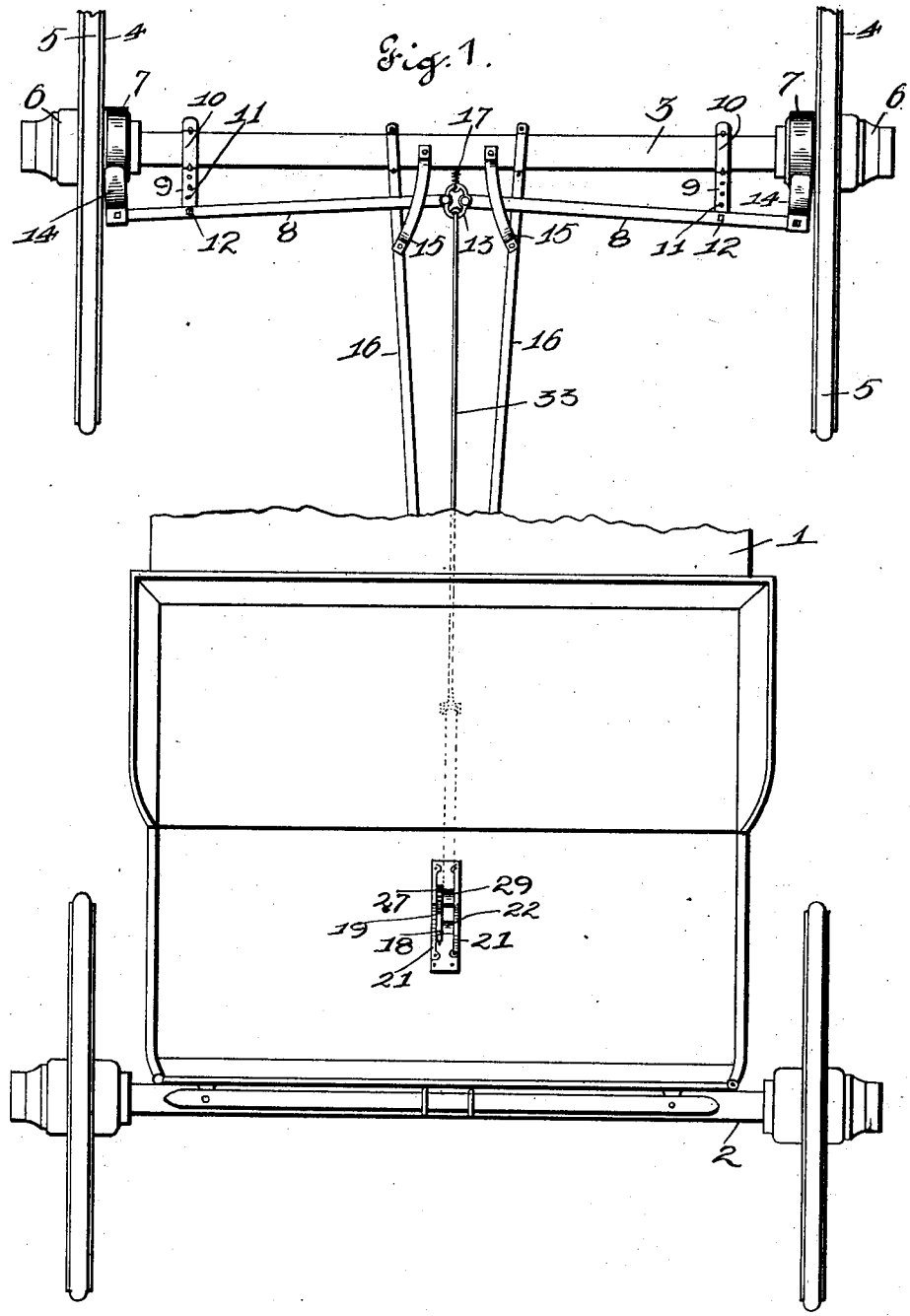

No. 753,732. PATENTED MAR. 1, 1904.
H. H. PIPER.
WAGON BRAKE.
APPLICATION FILED MAR. 3, 1903.
NO MODEL. 2 SHEETS—SHEET 1.

Witnesses
Alfred O. Eicker
M. Odrion

Inventor
Herbert H. Piper
by Higdon, Longan & Hopkins attys.

No. 753,732. PATENTED MAR. 1, 1904.
H. H. PIPER.
WAGON BRAKE.
APPLICATION FILED MAR. 3, 1903.
NO MODEL. 2 SHEETS—SHEET 2.
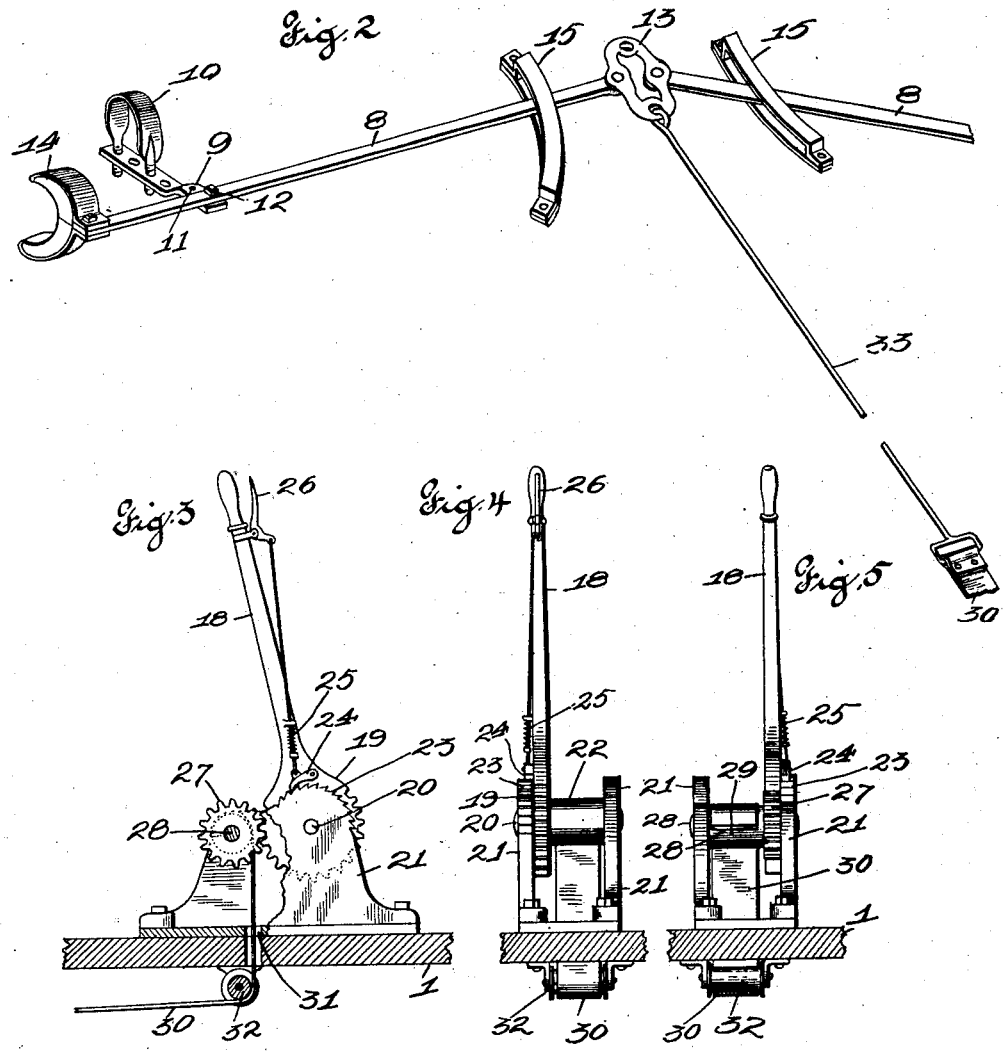

No. 753,732.

Patented March 1, 1904.

UNITED STATES PATENT OFFICE.

HERBERT H. PIPER, OF JACKSON, MISSOURI, ASSIGNOR OF FIVE-SIXTHS TO RICHARD REEHAN, PLEASANT SNIDER, AND HENRY J. BEHRENS, OF JACKSON, MISSOURI.

WAGON-BRAKE.

SPECIFICATION forming part of Letters Patent No. 753,732, dated March 1, 1904.

Application filed March 3, 1903. Serial No. 146,019. (No model.)

*To all whom it may concern:*

Be it known that I, HERBERT H. PIPER, a citizen of the United States, residing at Jackson, State of Missouri, have invented certain new and useful Improvements in Wagon-Brakes, of which the following is a specification containing a full, clear, and exact description, reference being had to the accompanying drawings, forming a part hereof.

My invention relates to a wagon-brake; and it consists in the novel construction, combination, and arrangement of parts hereinafter described and claimed.

The object of my invention is to provide an improved brake which shall be especially adapted for use upon rubber-tired vehicles, whereby the said tires will be rendered less liable to wear.

In the drawings, Figure 1 is a plan view of a vehicle having my improved brake applied thereto, parts being broken away. Fig. 2 is a detail view in perspective of my arrangement of brake-levers. Fig. 3 is a side elevation of the hand-lever and its connections. Fig. 4 is a front view thereof. Fig. 5 is a rear view thereof.

1 indicates the body of the vehicle supported in the usual manner upon the front axle 2 and rear axle 3 and these in turn supported upon wheels 4, provided with rubber tires 5. Upon the inner end of each of the rear hubs 6 I locate a metallic band 7.

8 8 indicate two brake-levers which extend parallel to the rear axle 3 and are fulcrumed thereto or to some fixed part of the running-gear, preferably, by means of the bracket 9, which is secured to the axle by means of a clip 10. The said clip has a horizontal extension in which is formed a series of apertures 11. The fulcrum-bolt 12 is adapted to be located in either of said apertures. The inner end of said brake-levers 8 8 are connected by means of a link 13, and the outer ends of said brake-levers carry a brake-shoe 14, which may be of any suitable material.

15 indicates a guide-bracket for the inner portion of the brake-levers, and this bracket has its rear end fixed to the rear axle 3 or some other part of the vehicle, and the forward end of said bracket is secured to the reach 16.

The brake-shoes are normally held out of contact with the metallic band 7 by means of a spring 17, one end of which is secured to the rear axle 3 and the opposite end of which is secured to the link 13.

18 indicates a hand-lever which is provided with an enlargement at its lower end in the form of a toothed sector 19, and said sector is pivotally mounted upon a pin or bolt 20, extending between the vertical brackets 21, which are bolted to the vehicle-body at a suitable point in front of the driver's seat.

22 indicates a sleeve mounted upon said bolt 20 between said brackets 21 in order to retain the hand-lever and its sector in position adjacent to one of said brackets. The bracket 21 which is nearest said sector is provided with a series of ratchet-teeth 23.

24 indicates a pawl which is pivoted to said hand-lever and is urged into contact with said ratchet-teeth by means of a spring 25. Said pawl is controlled by means of the ordinary lifting-handle 26 and connections carried by said hand-lever.

27 indicates a gear-wheel mounted upon a pin or bolt 28, extending from one of said brackets 21 to the other at a point in the rear of the said toothed sector 19, so that the teeth of said gear-wheel are in mesh with the teeth of said sector. The said gear-wheel is provided with a lateral hub 29, and secured to said hub in any suitable manner is one end of a flexible band 30, which may be of any suitable material and which extends downwardly through an aperture 31, formed in the base of the brackets 21 and also through an aperture formed in the vehicle-body, and said band passes under a small pulley or roller 32, and thus passes rearwardly and is connected to the front end of the brake-rod 33. The rear end of the brake-rod is connected to the link 13.

The operation is as follows: When it is desired to apply the brakes, the hand-lever 18 is thrown forward to the right hand in Fig. 3, which will rotate the gear-wheel 27 and wind the band 30 upon the hub 29, thereby tightening said band and drawing forward the inner ends of the brake-levers 8 8 by reason of the connection between the said band and said brake-rod 33. The forward movement of the inner ends of said brake-levers will cause their outer ends to be urged rearwardly a corresponding distance, and this will cause the brake-shoes 14 to forcibly engage the band 7 on the rear hubs 6, and in such manner the movement of the vehicle will be retarded.

It will thus be seen that the brakes will be applied without any contact of the brake-shoes with the rubber tires 5.

When it is desired to release the brake, the pawl 24 is released from the ratchet-teeth 23 and the hand-lever 18 is moved in a direction opposite to that in which it had previously been moved, which will thereby unwind the band 30 from the hub 29. This will permit said band to slacken, and then the spring 17 will cause all of the parts to assume normal position, with the brake-shoes out of contact. When it is desired to take up the slack between the brake-shoes and the band 7, it will only be necessary to remove the bolt 12 from one of the holes 11 in the brackets 9 and place said bolt in another hole.

What I claim is—

The improved wagon-brake, comprising brake-shoes, the part with which said brake-shoes come in contact, a hand-lever having an enlargement at its lower end in the form of a toothed sector, opposite brackets in which said toothed sector is mounted, one of said brackets having ratchet-teeth 23, a sleeve 22 between said brackets, a gear-wheel mounted adjacent to said toothed sector and meshing therewith, a band adapted to be wound and unwound by the rotation of said gear-wheel, and connections between said band and said brake-shoes, substantially as specified.

In testimony whereof I have signed my name to this specification in presence of two subscribing witnesses.

HERBERT H. PIPER.

Witnesses:
 M. G. IRION,
 JOHN C. HIGDON.